(12) United States Patent
von Seggern

(10) Patent No.: US 7,610,736 B2
(45) Date of Patent: Nov. 3, 2009

(54) METHOD AND SYSTEM FOR THE GAS-TIGHT PACKING OF OBJECTS

(75) Inventor: Jörg von Seggern, Oldenburg (DE)

(73) Assignee: Jörg von Seggern Maschinenbau GmbH, Oldenburg (DE)

( * ) Notice: Subject to any disclaimer, the term of this patent is extended or adjusted under 35 U.S.C. 154(b) by 0 days.

(21) Appl. No.: 12/002,351

(22) Filed: Dec. 17, 2007

(65) Prior Publication Data

US 2008/0148690 A1    Jun. 26, 2008

(30) Foreign Application Priority Data

Dec. 22, 2006    (DE)    ........................ 10 2006 061 309

(51) Int. Cl.
    *B65B 31/00*    (2006.01)
(52) U.S. Cl. .............................. 53/433; 53/403; 53/410; 53/510
(58) Field of Classification Search ................ 53/403, 53/410, 432, 433, 435, 471, 473, 478, 510, 53/511, 329.3, 173, 389.3
    See application file for complete search history.

(56) References Cited

U.S. PATENT DOCUMENTS

| 3,908,334 | A |   | 9/1975  | Rychiger |         |
|-----------|---|---|---------|----------|---------|
| 4,685,274 | A | * | 8/1987  | Garwood  | 53/433  |
| 4,997,664 | A | * | 3/1991  | Williams | 426/392 |
| 5,025,611 | A | * | 6/1991  | Garwood  | 53/509  |
| 5,155,974 | A | * | 10/1992 | Garwood  | 53/510  |
| 5,323,590 | A |   | 6/1994  | Garwood  |         |
| 5,447,736 | A | * | 9/1995  | Gorlich  | 426/396 |
| 5,560,182 | A | * | 10/1996 | Garwood  | 53/432  |
| 5,629,060 | A | * | 5/1997  | Garwood  | 428/35.2|

(Continued)

FOREIGN PATENT DOCUMENTS

DE    23 47 047    3/1984

(Continued)

OTHER PUBLICATIONS

German Office Action with English translation of same.

(Continued)

*Primary Examiner*—Hemant M Desai
(74) *Attorney, Agent, or Firm*—Collard & Roe, P.C.

(57) ABSTRACT

In a method for the gas-tight packing of objects with film material bearing tightly against the objects, by means of a vacuum, wherein the object is inserted in a bowl and a deep-drawable film is connected to the bowl for sealing the bowl, and wherein a bowl with at least one peripheral edge is used for forming the packaging material, the deep-drawable film is cut to the dimension of the peripheral edge and the deep-drawable film is subsequently or simultaneously applied to the peripheral edge in a gas-tight manner. A further film is then cut to the dimension of the peripheral edge during the application of the deep-drawable film, or after its application, and the further film is subsequently or simultaneously applied to the peripheral edge. The further film remains approximately in the plane of the peripheral edge after its application. A system for the gas-tight packing of objects with a first cutting device for a deep-drawable film has at least one cutting device for a further film.

18 Claims, 7 Drawing Sheets

U.S. PATENT DOCUMENTS

| | | | |
|---|---|---|---|
| 5,718,101 A * | 2/1998 | Noel et al. | 53/432 |
| 6,042,862 A * | 3/2000 | Kocher et al. | 426/411 |
| 6,044,622 A * | 4/2000 | Brady et al. | 53/412 |
| 7,269,932 B2 * | 9/2007 | Konishi | 53/329.5 |
| 2005/0257501 A1 * | 11/2005 | Natterer | 53/432 |
| 2007/0022717 A1 | 2/2007 | Seggern | |

FOREIGN PATENT DOCUMENTS

| | | |
|---|---|---|
| DE | 39 18 261 | 12/1990 |
| DE | 100 31 356 | 1/2002 |
| DE | 102 37 933 | 2/2004 |
| DE | 10 2005 035 476 | 2/2007 |
| EP | 0 899 209 | 3/1999 |
| FR | 2 565 552 | 12/1985 |
| FR | 2 725 692 | 4/1996 |
| WO | WO 87/02965 | 5/1987 |
| WO | WO 88/01592 * | 3/1988 |
| WO | WO 88/10592 | 3/1988 |

OTHER PUBLICATIONS

European Search Report with English translation of same.

* cited by examiner

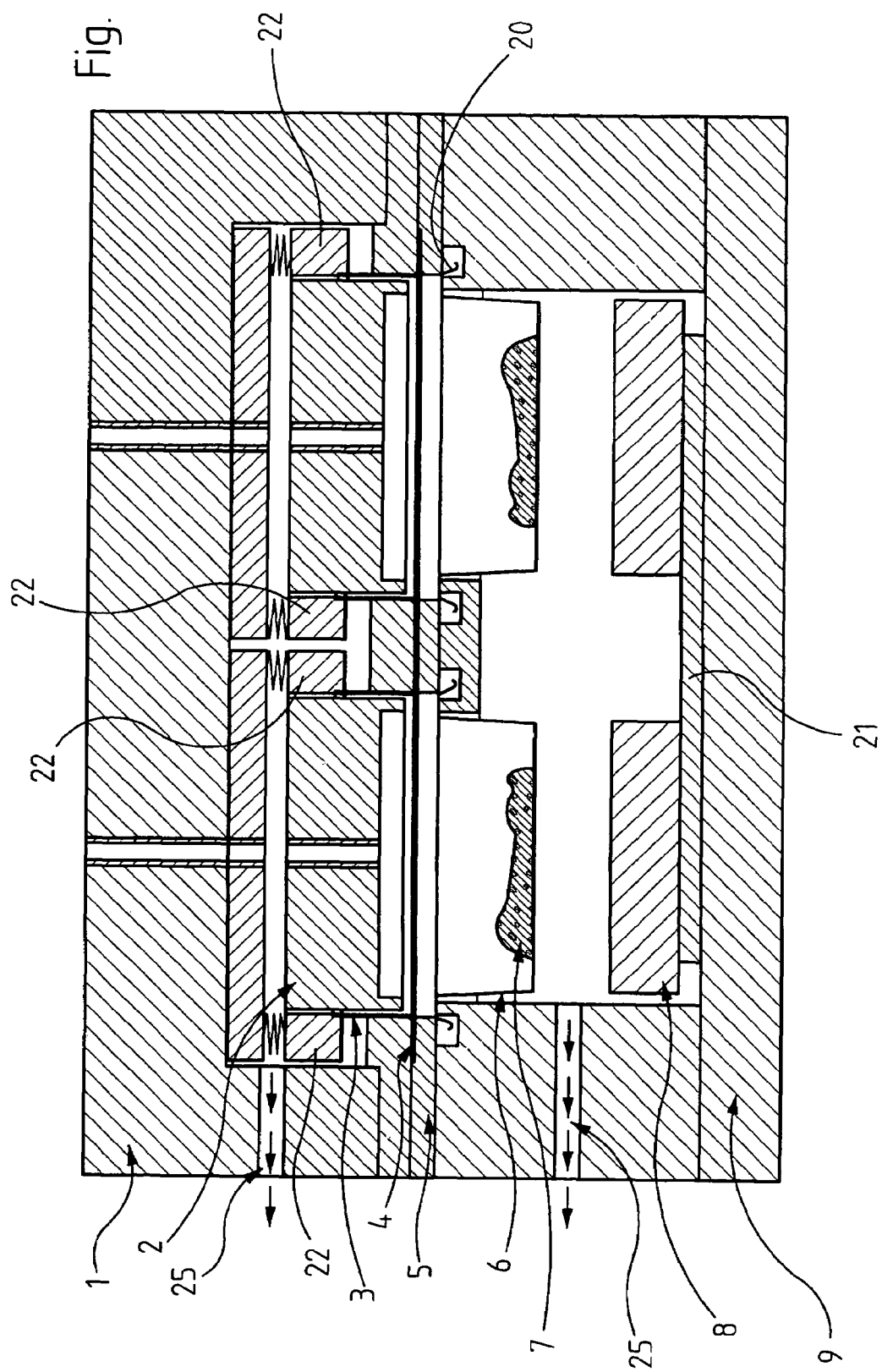

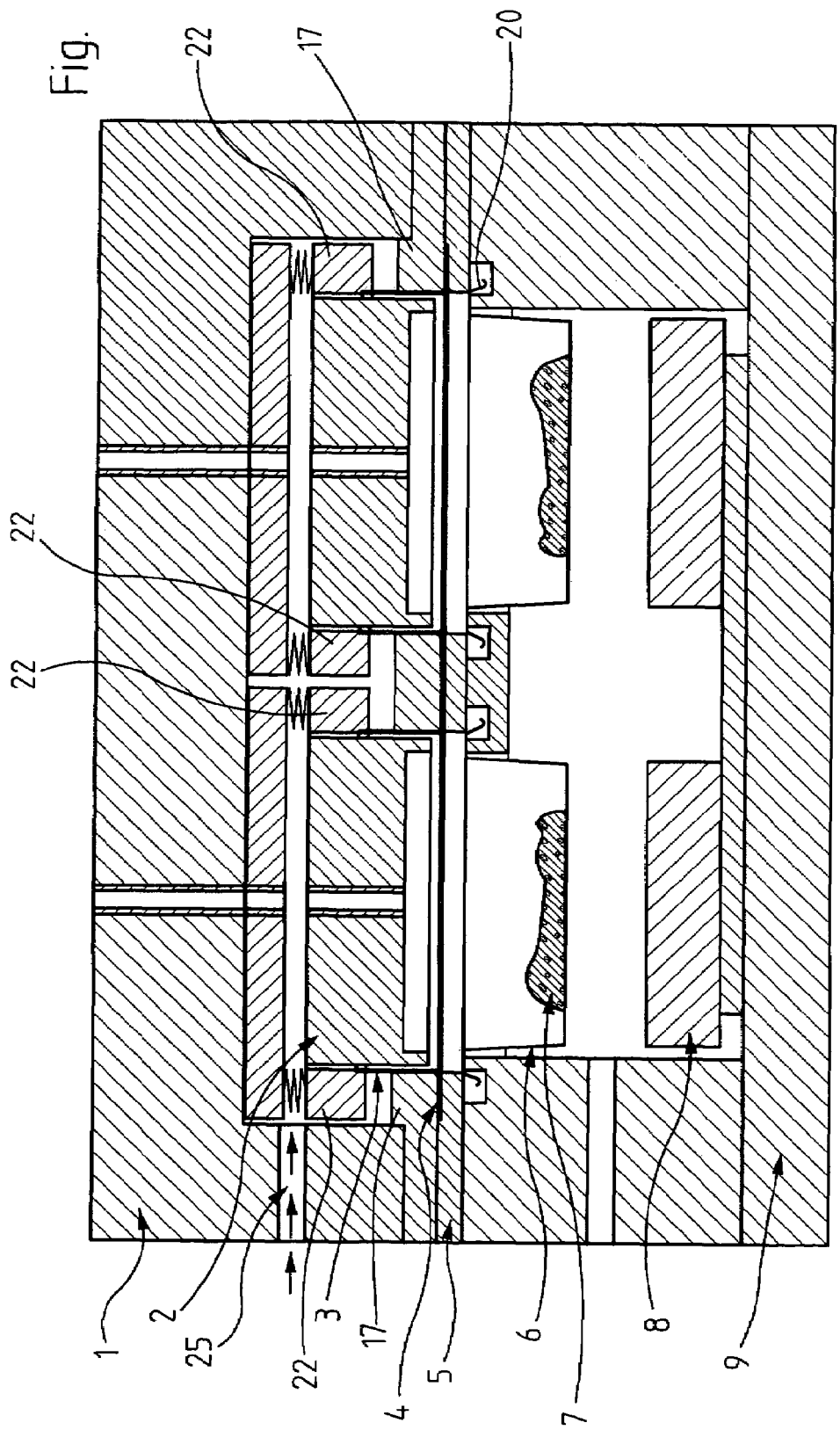

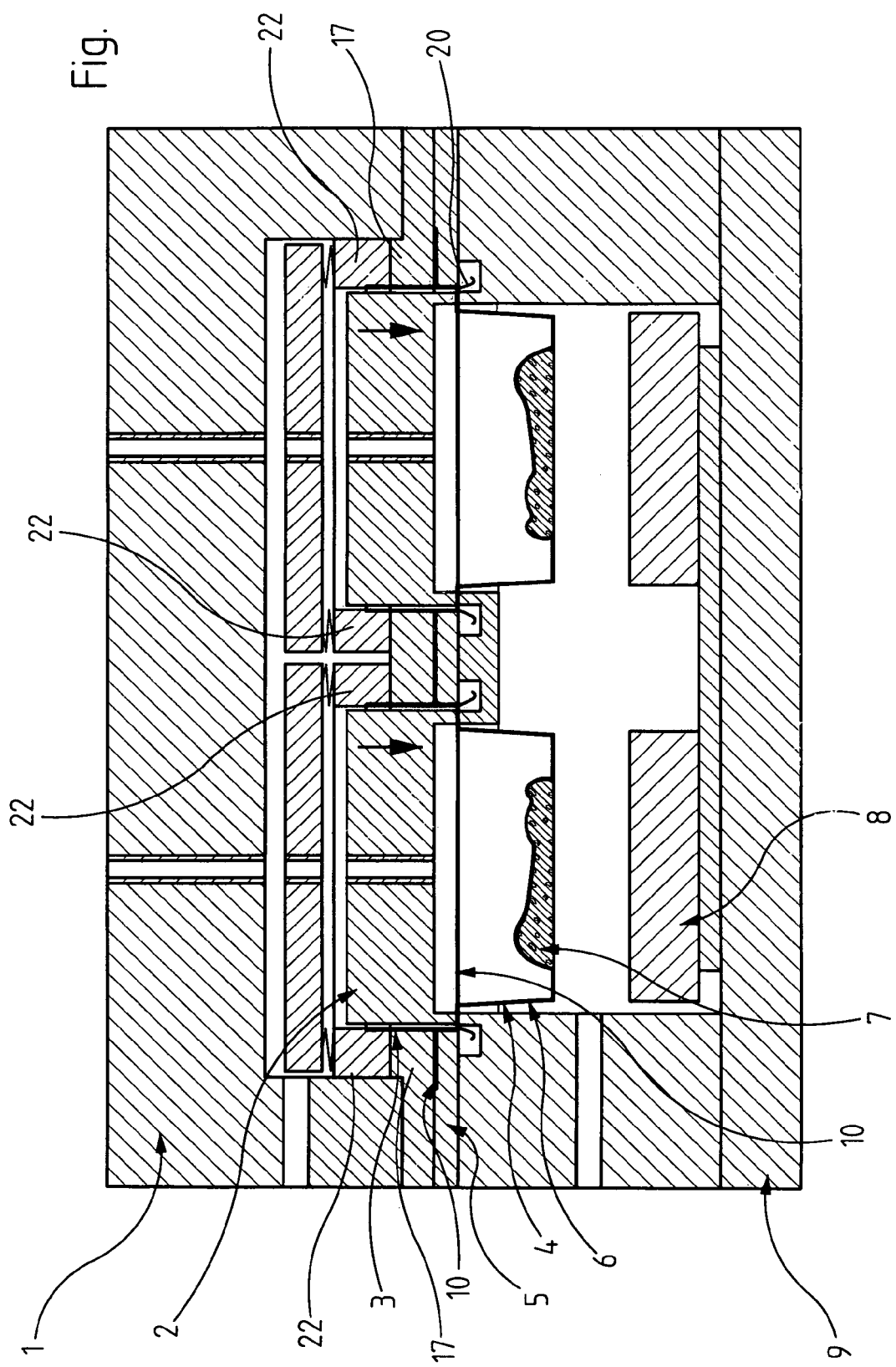

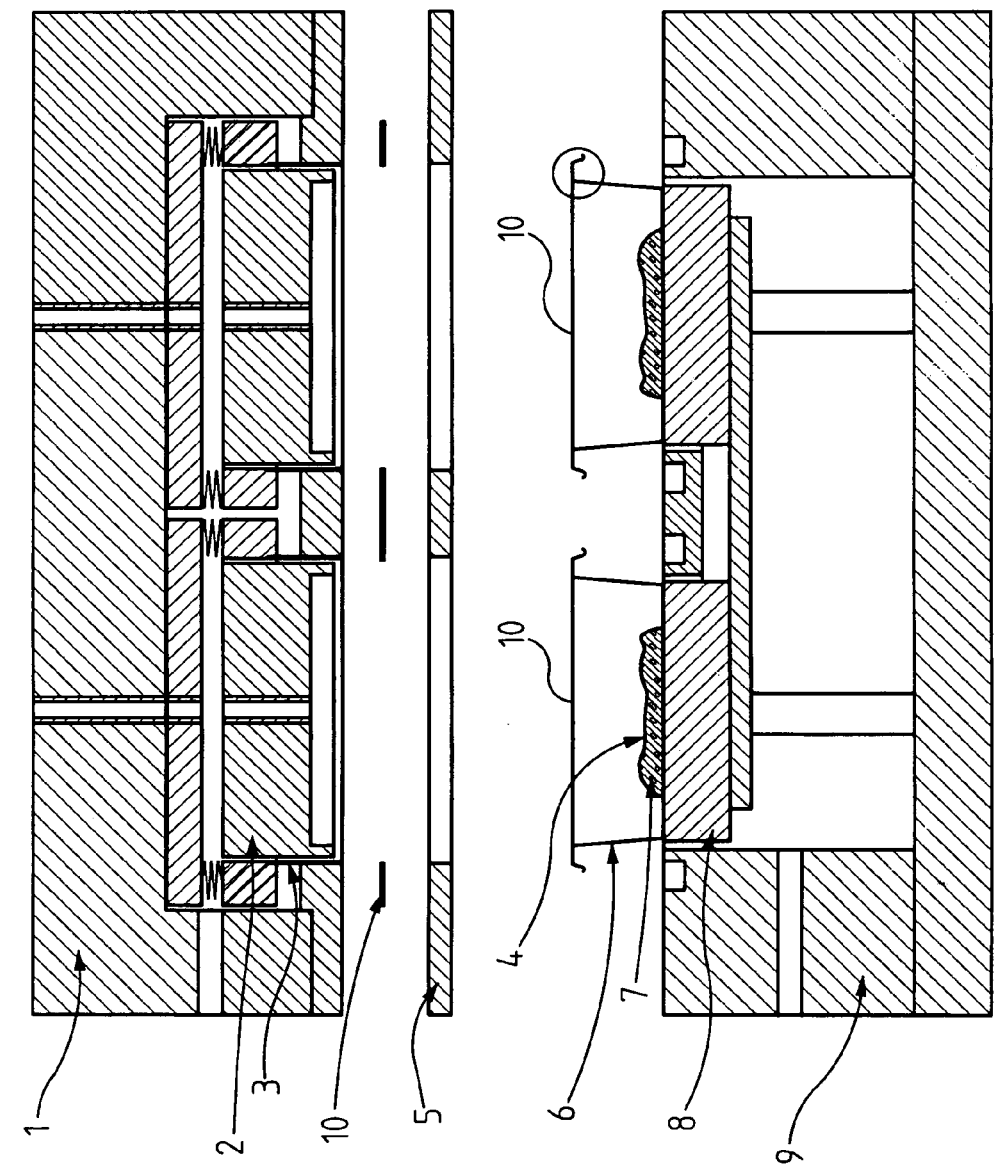
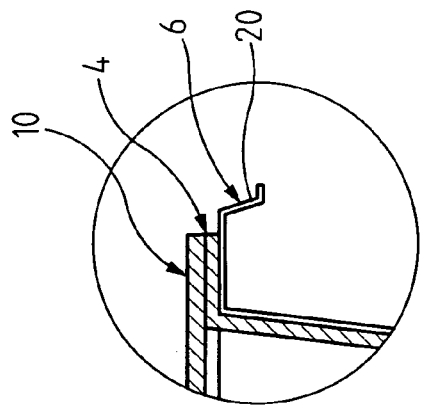

METHOD AND SYSTEM FOR THE GAS-TIGHT PACKING OF OBJECTS

BACKGROUND OF THE INVENTION

1. Field of the Invention

The invention relates to a method for the gas-tight packing of objects with film material bearing tightly against the objects, by means of a vacuum. The object is inserted in a bowl and a deep-drawable film is connected to the bowl for sealing the bowl. A bowl with at least one peripheral edge is used for forming the packing, and the deep-drawable film is cut to the dimension of the peripheral edge and is subsequently or simultaneously applied in a gas-tight manner to the peripheral edge.

The invention relates also to a system for the gas-tight packing of objects with film material bearing tightly against the objects, by means of a vacuum, preferably for carrying out the aforementioned method. The system comprises a support for at least one bowl, and at least one sealing tool for the deep-drawable film. There is at least one cutting device for the deep-drawable film. Finally the invention relates to a packaging material.

2. The Prior Art

The method and devices described above are used to pack objects. These objects may be inorganic products, such as tools or stationery, which are offered for sale in markets in suitable packing materials. When, in particular, a vacuum is used for deep-drawing the film which is welded to the bowl, the objects may be organic products such as food. Meat and sausage products in particular are packed with these types of packaging materials in order to leave as little gas volume as possible in the interior of the packaging material. In prior art methods, the procedure is that an object is inserted in a bowl and the deep-drawable film is then heat sealed to the bowl.

German Patent Application No. DE 10 2005 035 476.9 already discloses a method whereby a bowl with a peripheral edge is used for packing, the deep-drawable film is cut to the dimension of the peripheral edge, and the deep-drawable film is subsequently or simultaneously applied in a gas-tight manner to the peripheral edge. The peripheral edge is not therefore damaged when an object is packed, so that this edge can be provided from the beginning with a comfortable and easy to grip edging or other design. The peripheral edge of the bowl is preserved according to the invention in that before the deep-drawable film is applied to the peripheral edge, the same is cut. However, an irregular surface of the top of the packaging material is formed by the tight bearing of the deep-drawable film against the goods to be packed. This irregular upper surface of the packaging material has the disadvantage that instructions and representations printed on it can no longer be clearly seen. Moreover, such irregularly designed packaging materials are more difficult to stack than regularly designed packaging materials.

SUMMARY OF THE INVENTION

It is therefore an object of the invention to provide a method which enables objects to be packed in attractively designed gas-tight packaging materials, and to design these packaging materials so that they can be stacked and label them in the conventional manner. Furthermore, a system with which such packing is possible, and a packaging material, will be provided.

This object is achieved according to the invention, by a method for packing objects in which during the application of the deep-drawable film, or after its application, a further film is cut to the dimension of the peripheral edge and is subsequently or simultaneously applied to the peripheral edge. The further film remains approximately in the plane of the peripheral edge after its application.

According to the method according to the invention, at least two films are provided. While the first film, which is deep-drawable, may bear tightly against the goods to be packed, a second film is arranged in the plane of the peripheral edge. As in German Patent Application No. DE 10 2005 035 476.9, the procedure adopted is such that the further film is first cut to the dimension of the peripheral edge and is subsequently or simultaneously applied to the peripheral edge. An upper, regular sealing of the packaging material is therefore formed. For example, the packaging material is designed in the shape of a regular cuboid and can therefore be stacked. Moreover, information on the content and price or similar may be printed on the further film, or applied by any other means, which information is clearly legible because this film remains in an approximately horizontal plane.

In the method according to the invention, processing is therefore extended relative to the state of the art. A further film is cut, e.g. it is applied subsequently. Firstly, the advantage of this is that film is cut in its cold condition. In this condition, the film is hardened so that its clean cutting edges can be added. The formation of waves and warps is advantageously prevented. Secondly, cutting of the film after welding and hence in its heated condition is avoided. The peripheral edges of the bowl are not cut either since the cutting of the film can be carried out in its cold condition in a manner in which cutting tools provided for this purpose do not come into contact with the bowl. An edge design of the bowl is therefore maintained and sharp cutting edges are advantageously not produced.

According to one embodiment, the further film can be welded onto the peripheral edge. On the one hand a fixed, gas-tight connection is made by heat sealing between the film and the bowl. However, the further film may also be welded onto the deep-drawable film in the region of the peripheral edge. Both films then lie one above the other in the spatial region of the peripheral edge. The system of the individual film and the peripheral edge is produced by heat sealing, thereby producing a medium-tight connection of the film and the edge. In this case, the extension of each film is preferably slightly shorter than the area spanned by the outer peripheral edge.

According to another embodiment of the invention, a protective gas can be introduced into the intervening space to be formed between the deep-drawable film and the further film. A spacer, which is enclosed by the bowl wells, is formed between both films. An intermediate space is formed which can be used for receiving products. For example, sausages can be fed into the intervening space as an object in the case of a meat product. Other solid or liquid products may also be received in this intervening space, since both films are applied with the edge of the bowl in a gas- and liquid-tight manner.

The introduction of a protective gas in this intervening space can have various advantageous effects. If this protective gas is nitrogen or carbon dioxide, for example, this improves the durability of the products received in the intervening space. However, the protective gas may also be oxygen, which is advantageous for the appearance of the meat product when meat products are packed.

In order not to damage or stretch the further film, a normal pressure can be applied in the intervening space and in the surrounding region of the bowl. Normal pressure conditions therefore prevail in the intervening space. The further film is not affected by these pressure conditions, so that it remains in the plane of the peripheral edge. These pressure conditions are also maintained when a protective gas is introduced.

In one embodiment, the deep-drawable film can be a film material unilaterally permeable to the gas, the deep-drawable film being arranged in such a manner that gas can be supplied from the outside to the object. The gas supplied can be positive for the object, for example oxygen for a meat product. This contributes to the bright red coloration of the meat product.

The system according to the invention can have a second sealing tool for the further film and at least one second cutting tool for the further film.

According to the method according to the invention, the further film is first cut, then applied to the bowl. When this procedure is used, a separate cutting station is no longer required for the film. According to the invention, it may be assigned to the system since the film is cut in advance of or simultaneously with the sealing or heat sealing of the film.

The cutting device preferably comprises cutter blades with which cutting of the further film can be successfully carried out.

In one embodiment of the system according to the invention, the cutting device is assigned spatially to the sealing tool. Because of this spatial assignment, simultaneous cutting and sealing can be carried out, and cutting and sealing following shortly one after the other is also possible. The assignment of the cutting device and the sealing tool to each other is spatially provided, and both assemblies are structurally independent of each other to enable the cutting and sealing operations to be carried out separately.

The cutting device may rotate around the sealing tool. For example, if the sealing tool is of a rectangular design, cutter blades of the cutting device may rotate around this sealing tool like a frame. Before the sealing tool is placed on the film, the same is cut with the cutter blades designed in the form of a frame. For the constructive design of the system, the bowl and/or the sealing tool is/are guided so that it/they can be vertically adjusted. The support and sealing tool may therefore be brought closer together and separated from each other. The action of bringing them together is used to place the sealing tool on the further film if it is brought to rest on the peripheral edge of the bowl.

A next further development of the invention provides that the support has at least one supporting device for the peripheral edge of the bowl. The bowl can be inserted into the support device for the peripheral edge by means of the support. The peripheral edge is preferably placed on this support device so that it is ready for heat sealing or sealing with the further foil. The support device supports the peripheral edge and forms a counter bearing for the sealing tool to be placed on the edge.

According to a next further development of the device according to the invention, a spacer plate can be arranged between the bowls and the further film, and can be positioned on the support device for the peripheral edge, while the peripheral edge remains free, at least in sections. The top surface of the spacer plate now forms a plane which is arranged above the peripheral edge. The film can be placed on this plane and the cutting device can be placed on the further film in this plane. If the film has been cut, it drops through the spacer plate and is deposited on the peripheral edges. These peripheral edges are kept free by the spacer plate.

When this spacer plate with the openings is used, it is advantageous for the cutting device to be spatially assigned to the sealing tool. When the sealing tool is brought up to the further foil, the cutting device may be fed to it at the same time. Here, the cutting device is preferably moved close by one edge of the opening of the spacer plate, so that a shearing effect, with which the cold film is separated to produce a clean cutting edge, is produced between a cutter blade of the cutting device and this edge of the opening. In this case, the cutting tool is preferably uncoupled by the sealing tool and spring mounted. This uncoupling then enables the sealing tool to be brought more closely up to the bowl than the cutting tool. After the sealing tool has been brought up in this manner, sealing may take place between the film and the bowl, while the cutting tool remains in a position distant from the bowl in order not to damage the peripheral edge of the bowl.

The invention also comprises a packaging material produced by the method according to the invention. In this packaging material, the further film, after being placed on at least one peripheral edge of the bowl, covers this edge and/or the deep-drawable film in sections.

According to the invention, the film is placed on the peripheral edge not to fully cover this edge. The film may have be offset to the outer edge of the peripheral edge, so that it does not come into contact with this edge. Instead, it may be welded onto a region of the peripheral edge or the deep-drawable film already welded onto to the peripheral edge, which edge is still some distance apart from the outer edge of the peripheral edge. This produces a clean welded seam.

A peripheral edge of the bowl is in this case always the region of the bowl surface which circumferentially encloses at least one recess in the bowl. The bowl may have a recess which is surrounded by a peripheral edge. Here, it is also possible for several recesses to be arranged in an overall packaging material, for example in the case of a plurality of yogurt pots linked together. A separate further film, which is only connected to the peripheral edge which surrounds this recess, can be assigned to each of these recesses. There is therefore no general covering of the different recesses with a further film, but a plurality of films is provided. Between the individual recesses, this packaging material has regions which are not occupied by a film. In these regions, perforations may then be preferably made to facilitate isolation of the individual packaging material regions from each other. In this case, pull-off tabs of both the further and deep-drawable film may also be inserted in an inner region by a device in the outer region of the overall packaging material, for example where the films of a plurality of recesses are brought closer together.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIGS. 2 to 7 show sectional views of the system shown in FIG. 1 on the right for the gas-right packing of objects in different processing situations during a packing process; and FIG. 8 shows a representation of detail V in FIG. 7 on a larger scale.

DETAILED DESCRIPTION OF THE PREFERRED EMBODIMENT

Figure 1:
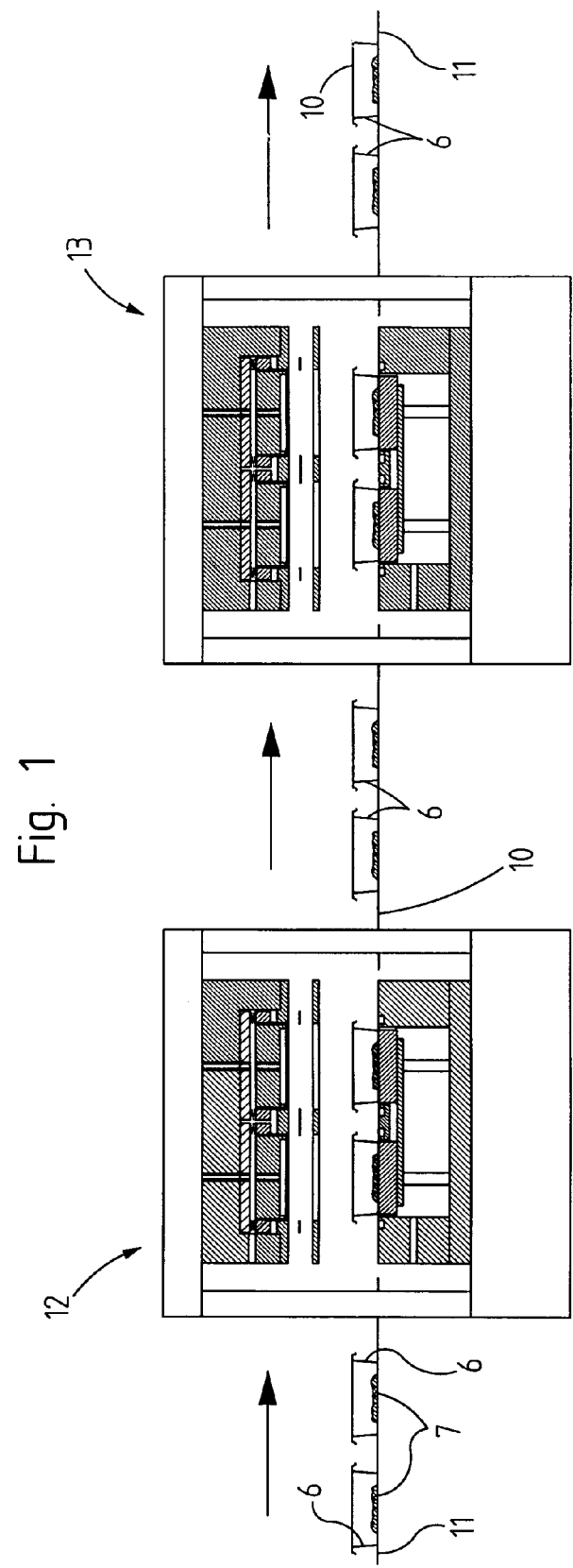
FIG. 1 shows a sectional view of two devices for the gas-tight packing of objects with film material bearing tightly against the objects.

Referring now in detail to the drawings, FIG. 1 shows two devices following each other in a processing sequence for packing objects 7. Objects 7 to be packed lie in bowls 6, which stand upright on conveyor belts 11. A deep-drawable film 4 bears tightly against objects 7 in the first device 12. The method and the device for this process are described in German Patent No. DE 10 2005 035 476.9, the disclosure of which is herein incorporated by reference.

According to the invention, an additional system 13 is provided in which bowls 6 are equipped with a further film 10. This system 13 is described in more detail in the following FIGS. 2 to 7.

The system in the figures has a lower tool 9 and an upper tool 1. Lower tool 9 comprises two support tables 8 for two bowls 6. Each of bowls 6 has a peripheral edge 20. Support tables 8 are placed on a frame 12, which is vertically adjustable.

Two sealing tools 2 are accommodated in upper tool 1. Upper tool 1 is in this case guided so that it is vertically adjustable.

Cutting devices 3, which are designed as cutters rotating around sealing tools 2, are spatially assigned to sealing tools 2. Cutting devices 3 are accommodated in spring mounted cutter holders 22.

Figure 2:
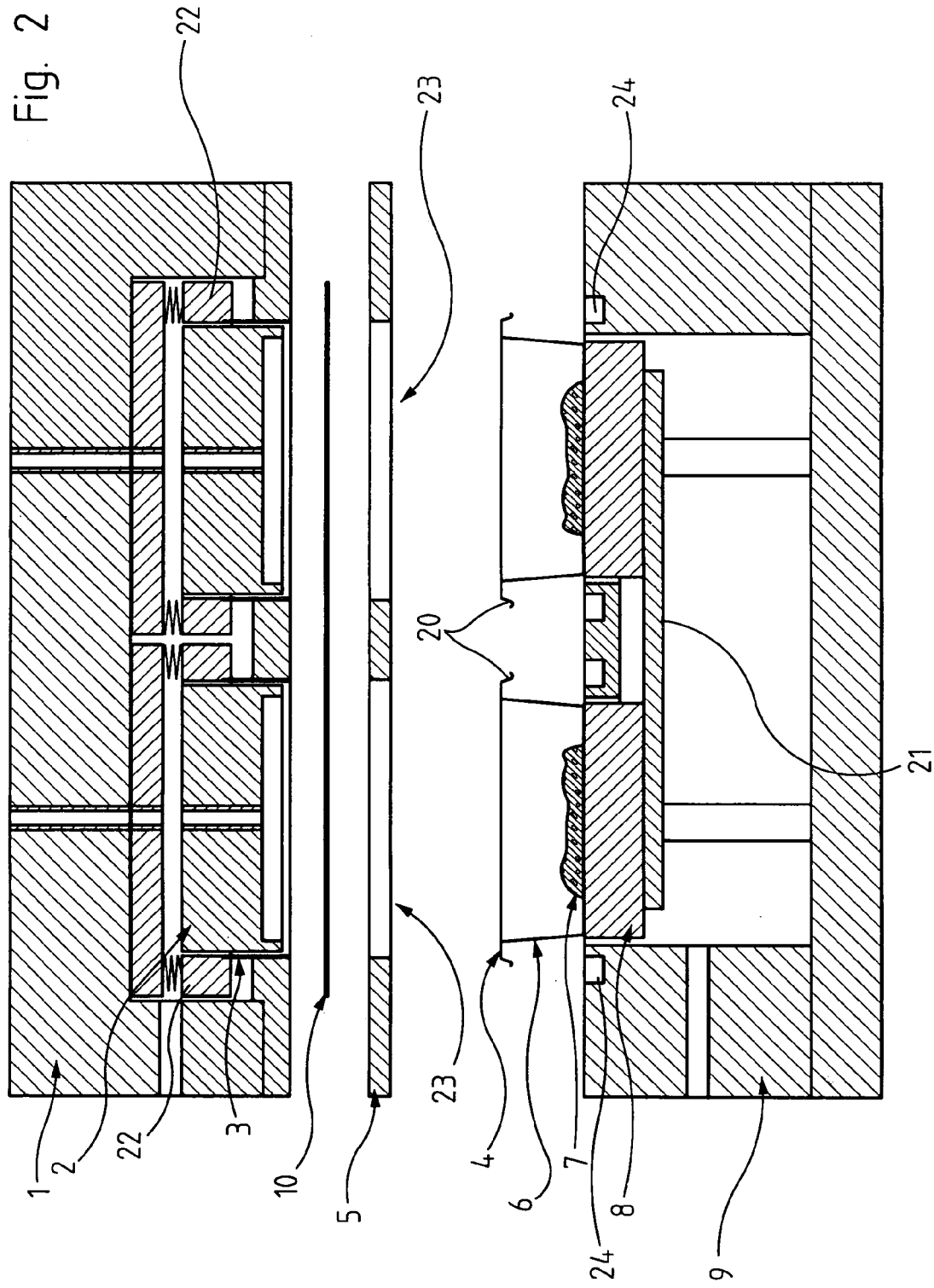

In FIGS. 2 to 7, a deep-drawable film 4 has already been applied to objects 7. FIG. 2 also shows a further film 10. This film 10 already exists in one piece before it is sealed onto peripheral edges 20 of bowls 6.

The device also has a spacer plate 5 between the further film 10 and bowls 6. This spacer plate 5 has openings 23 which correspond to bowls 6.

Figure 3:
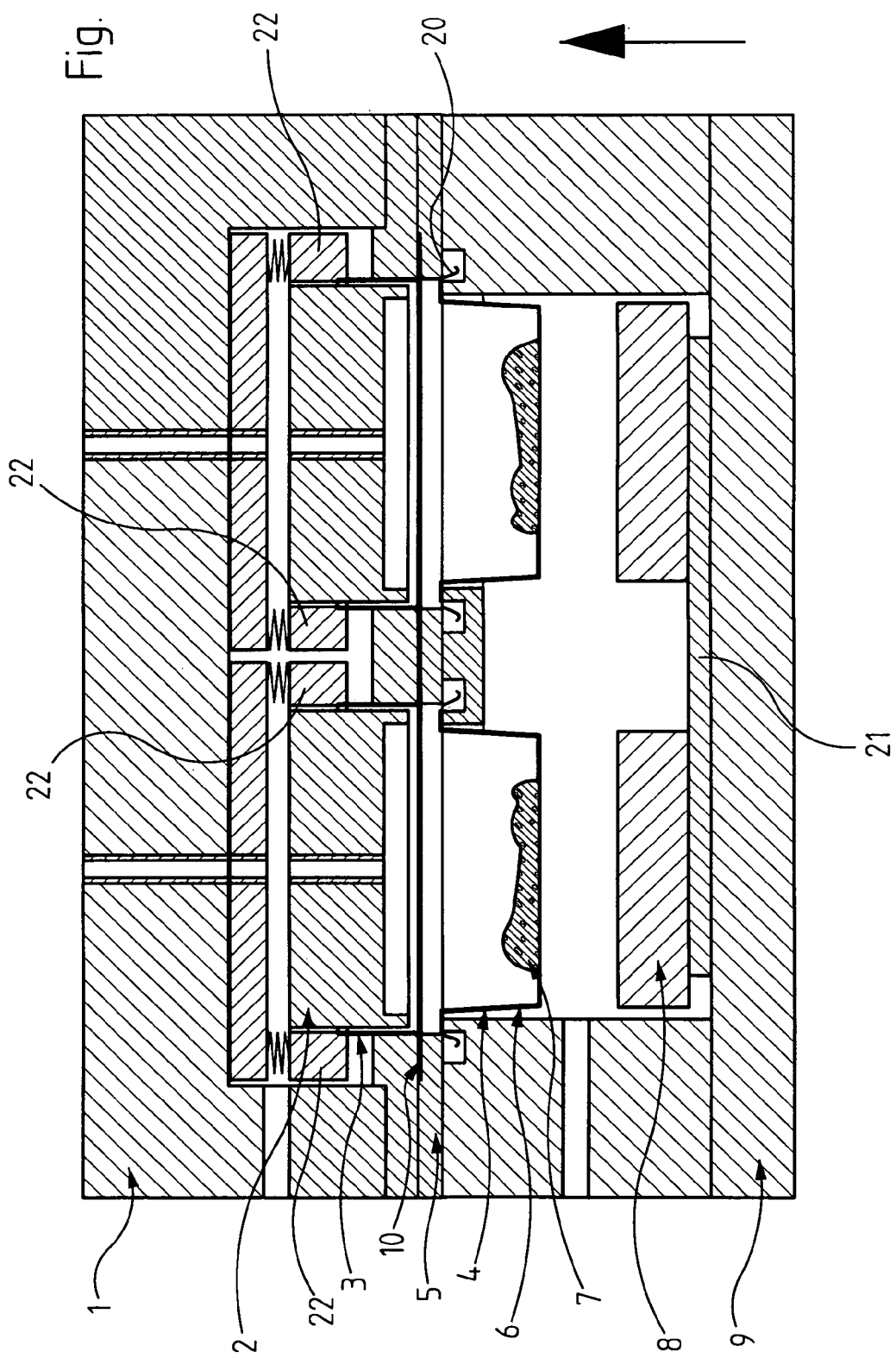

A further support device is assigned to support tables 8 in the region of lower tool 9. This support device is formed by the uppermost sections of lower tool 9. Recesses 24, into which peripheral edges 20 of bowls 6 are able to project, are let into the surface of lower tool 9 in the region of this support device. FIG. 3 shows the condition after the raising of lower tool 9. Bowls 6 are placed on the support device of lower tool 9. Their peripheral edges 20 are supported by lower tool 9.

Spacer plate 5 is placed on lower tool 9. Further film 10 lies on spacer plate 5, and upper tool 1, with sealing tools 2 and cutting devices 3, is brought closer to film 10. Cutting devices 3 already lie almost on film 10, and they are guided closely along assigned edges of spacer plate 5 as they approach closer to bowls 6, as shown in FIG. 6.

In FIG. 6, cutting devices 3 are not brought up as far as peripheral edges 20 of bowls 6. Brackets 22 of cutting devices 3 lie in their lowest position on stops 17. Cutting devices 3 are kept at a distance from peripheral edges 20 with these stops 17. These edges 20 are therefore not cut through by cutting devices 3 since cutting devices 3 are able to spring back into their brackets 22. The cut off regions of further film 10 are then welded onto peripheral edges 20 by means of sealing tools 2.

FIGS. 4 and 5 show that a protective atmosphere can be generated in the area surrounding bowl 6, which atmosphere results in protective gas filling of bowls 6. According to the arrows shown in FIG. 4, the ambient atmosphere can be removed from the region of bowls 6 via ducts 25. As shown in FIG. 5, a protective gas can then be fed into the region above bowls 6 via duct 25 arranged in upper tool 1. This protective gas, nitrogen or carbon dioxide, for example, is fed into bowls 6. When further film 10 is sealed onto to bowls 6, according to FIG. 6, the protective gas is arranged in the intervening space between both films 4 and 10.

FIG. 7 shows the condition of the device after bowls 6 are removed from the mold. Upper tool 1 and lower tool 9 are again separated from one another, and spacer plate 5 is raised from bowls 6. Cutting residues remain from further film 10 and are disposed of. Bowls 6 can be removed from lower tool 9 after this sealing process, which tool is then able to receive new bowls 6. The device can in this case operate in cycles, for example at 6 cycles per minute.

The device according to the invention may be a sealing device with which bowls can be sealed with further films 10 which are not deep drawn in first device 12 in the "skin" process. The same device can therefore be used for different packing methods in which the same standardized basic packaging materials, such as bowls 6, are used.

The cutting of further film 10 and heat sealing onto peripheral edges 20 take place preferably in the same cycle in order to shorten the processing time. Cutting devices 3 are not guided through the plane of peripheral edges 20. FIG. 8 shows that further film 10 is cut off cleanly and that a region of this peripheral edge 20 remains free from films 4 and 10 in the region of peripheral edge 20. Cutting devices 3 do not cut off peripheral edge 20, and thus cannot be damaged by sections of objects to be packed projecting from edge 20, e.g. ice cream sticks or bone parts.

While deep-drawable film 4 bears tightly against the walls of container 6 and against objects 7 present in the recess of container 6, further film 10 remains in the vertical plane of peripheral edge 20. Both films 4 and 10 lie one above the other, in sections, in the region of peripheral edge 20. Both films 4, 10 have been cut before being sealed onto container 6 or onto deep-drawable film 4.

Accordingly, while only a few embodiments of the present invention have been shown and described, many changes and modifications may be made thereunto without departing from the spirit and scope of the invention.

What is claimed is:

1. A method for gas-tight packing objects with film material bearing tightly against the objects, by means of a vacuum, comprising the following steps:
   inserting the object into a bowl having at least one peripheral edge;
   connecting a deep-drawable film to the bowl for sealing the bowl,
   cutting the deep-drawable film to the dimension of the peripheral edge;
   applying the deep-drawable film to the peripheral edge in a gas-tight manner;
   cutting a further film to the dimension of the peripheral edge either during or after said step of applying, without cutting the peripheral edge; and
   applying the further film to the peripheral edge after said step of cutting, wherein the further film, after its application, remains approximately in a plane of the peripheral edge and wherein a region of the peripheral edge remains free of the further film after said further film is applied to the peripheral edge.

2. A method according to claim 1, wherein the further film is welded onto the peripheral edge.

3. A method according to claim 1, wherein the further film is welded onto the deep-drawable film in a region of the peripheral edge.

4. A method according to claim 1, further comprising the step of introducing a protective gas in an intervening space formed between the deep-drawable film and the further film.

5. A method according to claim 4, wherein oxygen, nitrogen or carbon dioxide is used as the protective gas.

6. A method according to claim 1, wherein a normal pressure is formed in an intervening space between the deep-drawable film and the further film, and in a surrounding region of the further film on a side facing away from the bowl.

7. A method according to claim 1, wherein a film material that is unilaterally permeable to gas is used as the deep-drawable film, and wherein the deep-drawable film is arranged so that gas can be supplied from outside to the object.

8. A system for gas-tight packing of objects with film material bearing tightly against the objects, by means of a vacuum, the object being placed in a bowl having a peripheral edge, sealed by a deep-drawable film and a further film being placed over the bowl, the system comprising:
   a support for the bowl;
   at least one sealing tool for sealing the deep-drawable film to the bowl;
   at least one cutting device for cutting the deep-drawable film;
   at least one second sealing tool for sealing the further film to an edge of the bowl; and
   at least one second cutting device for cutting the further film, said second cutting device being arranged such that said second cutting device does not cut the bowl during a cutting operation, and such that the second cutting device cuts the further film to a size that leaves a region of the edge of the bowl free from the further film after the film is sealed to the edge of the bowl.

9. A system according to claim 8, wherein the second cutting device comprises cutter blades.

10. A system according to claim 9, wherein the support for the bowl or the sealing tool is vertically adjustable.

11. A system according to claim 10, wherein the support has at least one support device for the peripheral edge of the bowl.

12. A system according to claim 11, further comprising a spacer plate arranged between the bowl and the further film, which plate is placed on the support device, and wherein the peripheral edge remains free at least in sections.

13. A system according to claim 12, wherein the spacer plate has at least one opening that can be brought to overlap the bowl.

14. A system according to claim 13, wherein the sealing tool has dimensions that correspond to the opening in the spacer plate.

15. A system according to claim 14, wherein the cutting device is assigned to the sealing tool and is guided near one edge of the opening of the spacer plate.

16. A system according to claim 15, wherein the cutting tool is uncoupled from the sealing tool and is spring mounted.

17. A system according to claim 8, wherein the second cutting device is assigned spatially to the second sealing tool.

18. A system according to claim 17, wherein the second cutting device rotates around the sealing tool.

* * * * *